United States Patent

Carias

[11] 3,797,612
[45] Mar. 19, 1974

[54] BRAKING DEVICE FOR VEHICLES
[76] Inventor: Andre Carias, 23, Avenue de Mendiguren, Nice (Alpes Maritimes), France
[22] Filed: July 13, 1972
[21] Appl. No.: 271,418

[30] Foreign Application Priority Data
July 13, 1971 France .............................. 71.25730
July 7, 1971 France .............................. 71.24601

[52] U.S. Cl. ................................. 188/79, 188/18 R
[51] Int. Cl. ........................................... F16d 51/44
[58] Field of Search ........ 188/2 R, 18 R, 79, 218 R; 301/36 R

[56] References Cited
UNITED STATES PATENTS
2,334,692 11/1943 Ash ................................... 188/79 X
2,190,583 2/1940 Wyatt ......................... 301/36 R UX Primary Examiner—Duane A. Reger
Attorney, Agent, or Firm—Berman, Bishoff & Platt

[57] ABSTRACT

The invention relates to a braking device for vehicles which provides the driver with two completely independent means of braking so that he is able to use either one or the other according to the temperature reached by one of the means as the result of preceeding applications of the brake.

7 Claims, 2 Drawing Figures

BRAKING DEVICE FOR VEHICLES

BACKGROUND OF THE INVENTION

The invention relates to a braking device for vehicles when the linings which act on the brake drum become burning hot and inoperable as a result of intense application of the brake.

SUMMARY OF THE INVENTION

The braking device according to the invention comprises two brake drums fixed to one another and mounted rotatably on a journal of a vehicle, the device being characterized in that at least one of the brake drums is supported by a circular component of an outer drum which is fixed by means of screws, on one hand to the brake drum and on the other to the wheel-support rim. The circular rim-supporting components of each outer drum and each brake drum are fixed on a single-piece disc whose radial walls constitute the application surfaces of said circular components of said drums.

BRIEF DESCRIPTION OF THE DRAWINGS

The braking device is illustrated in the accompanying drawings in which.

GENERAL DESCRIPTION OF PREFERED EMBODIMENTS

Figure 1:
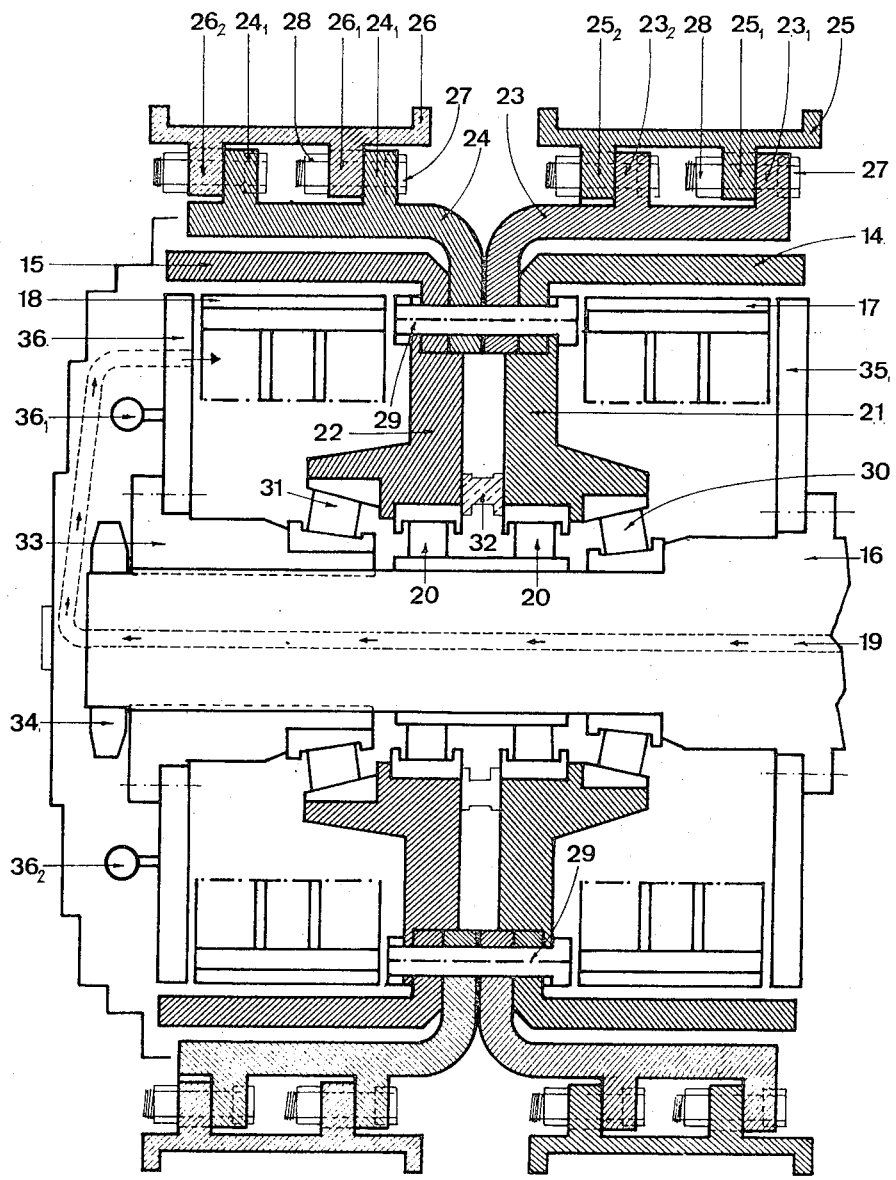
FIG. 1 is an axial cross-section showing an embodiment of the braking device.

According to the device, each wheel or each group of twin wheels, whether powered or not, comprises two brake drums 14 and 15 which are secured together so as to become an integral part of one another and are mounted rotatably on a journal 16.

On the inner face of each of the drums 14 and 15 is applied a brake lining 17, 18 which is controlled from the driving compartment of the vehicle by means of a fluid transmission circuit or a cable. In the example shown on the adjoining figure, the outer lining 18, provided on the drum 15, is controlled by means of a fluid circuit which passes through the cut 19 on the journal 16.

Each drum is mounted rotatably on the journal 16 by means of a cylindrical bearing 20 located in the interior of a disc 21, 22.

According to the invention, each of the brake drums 14 and 15 supports a circular component 23, 24 of an outer drum which is fixed between the two drums 14 and 15 and which is folded over along its periphery. Each circular component 23, 24 comprises, on parallel planes, the lugs $23_1$, $23_2$, and $24_1$, $24_2$, in a staggered arrangement, these lugs $23_1$, $23_2$, $24_1$, $24_2$ serving to fix the rims 25 and 26 of the tyres, by means of the screws 27 and the nuts 28 engaging also with lugs of corresponding shape $25_1$, $25_2$, $26_1$, $26_2$ formed on the inner face of the rims 25, 26.

The assembly of the components 23, 24 of the outer drums onto the brake drums 14, 15 as well as the fitting of these drums on their respective disc 21, 22 is effected simultaneously by means of the assembly screw 29.

Each of the discs 21, 22 comprises a lateral prolongation onto which is applied a conical roller bearing 30, 31 enabling the double brake assembly to be locked.

In addition, a spacer ring 32 is provided between the two discs 21, 22 in order to maintain the bearings 20 on the discs 21, 22.

The bearing 31 is held on the journal 16 by means of a splined sleeve 33 mounted on the end of this journal, this sleeve 33 being held in addition axially by means of a nut 34.

In each of the brake drums 14, 15 are provided linings 17 and 18 which are mounted on pairs of unnumbered jaws pivotally secured to the annular plates or flanges 35, 36 so as to swing against the drums as in conventional braking operation. Completely independent means for operating the brake jaws in the two brake drums 14,15 are provided so that either brake assembly in drum 14 or 15 may be used according to whether the temperature in the other brake drum has reached too high a level as a result of prior applications of the brake therein.

The inner flange 35 is fixed on the flange of the journal 16, while the flange 36 of the outer drum is held by the sleeve 33. The handles $36_1$ and $36_2$ are also provided on the plate or flange 36 so as to enable manual assembly and disassembly of the external brake in an easy manner.

Figure 2:
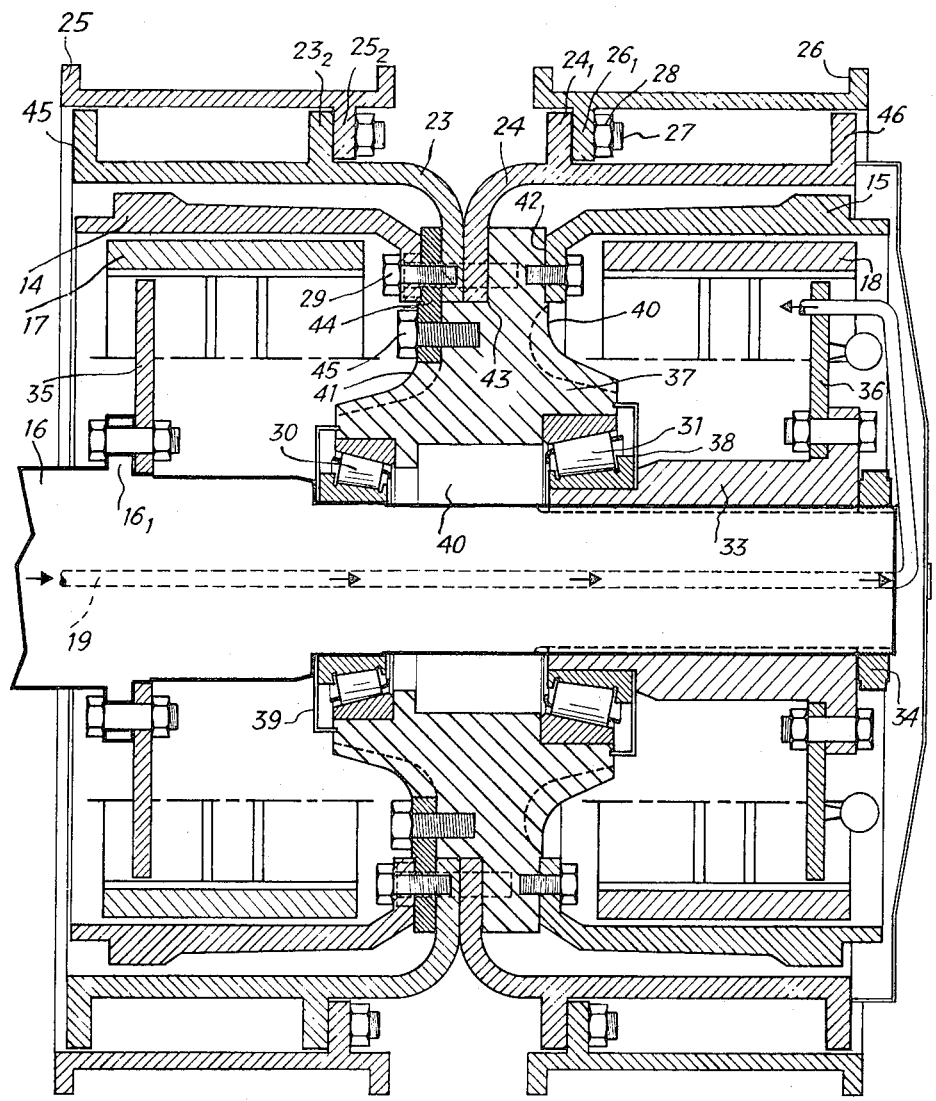
FIG. 2 is an axial cross-section of the braking device showing a variant of the embodiment.

The object of the device illustrated in FIG. 2 is to provide a simpler and more rigid connecting link between the outer drums, the brake drums and the journal of the vehicle.

To this end therefore a connecting link is provided by a single piece disc 37, placed generally between the brake drums 14 and 15. The single piece 37 is connected to the journal 16 by means of conical bearings 30, 31, the conical bearing 30 being carried directly by the journal 16 while the bearing 31 is carried by the intermediate sleeve 33. Each of the bearings 30 and 31 is insulated by a sealing joint, respectively 38, 39, delimiting, with the body of the disc 37 and the journal 16, a chamber 40 constituting a lubricant reserve. The single-piece disc 37 has radial walls 40, 41 which constitute the application surfaces for the rim-supporting outer drums 23, 24 and the brake drums 14 and 15. The radial application face 40 is provided with a recess with a shoulder for centering the drum 15. The radial application wall 41 of the disc 37 is provided with a recess in the form of a step for centering the two outer drums 23, 24, which are joined to one another and the total thickness of which is equal to the thickness of the recess 43. The components 23 and 24 are thus centered with respect to the radial face 41 of the disc 37. The rim-supporting outer drums are held in the recess in the form of a step by means of an application ring 44 which carries two series of orifices on co-axial circles for the passage of the securing screws 45 and 29. The external face of the ring 44 carries a recess with a shoulder on which is centered the radial part of the drum 14.

The drum 14 is held on the flange by means of the screws 29.

For the sake of simplicity, the rims 25 and 26 are no longer fixed to the outer drums 23 and 24 except by the lugs $24_1$ and $23_2$, these lugs being located close to the radial parts of the outer drums 23 and 24.

The rims 25 and 26 are supported close to the axial end of the outer drums 23, 24 by means of support studs respectively 45, 46.

What is claimed :

1. A braking device for a vehicle wheel, comprising a wheel journal, disc means rotatably mounted on said journal, a pair of inner and outer brake drums detachably secured to each other and to said disc means to rotate with the latter, said brake drums having cylindrical braking surfaces lying in opposite directions with respect to said disc means to define opposed openings in said drums, a second pair of drums larger than the brake drums encasing the brake drums and being detachably secured to both said brake drums and said disc means, each drum of said second pair having lugs protruding radially outwardly, a pair of rims mounted on said second pair of drums, each rim having inwardly directed lugs for detachable securement to the lugs of the second pair of drums, a first plate detachably secured to said journal and partially closing the opening of the inner brake drum, a sleeve secured to the outer end of said journal, a second plate detachably secured to said sleeve and partially closing the opening of the outer brake drum, and a pair of jaws within each brake drum, each jaw carrying a brake lining, said pairs of jaws being operatively mounted on said plates to engage the brake linings against said brake drums during braking.

2. A braking device according to claim 1, wherein said sleeve is secured to the journal by spline and groove means.

3. A braking device according to claim 1, wherein said sleeve supports a bearing which rotatably supports said disc means.

4. A braking device according to claim 1, wherein means is provided for actuating the pair of jaws within one brake drum independently of the pair of jaws within the other brake drum.

5. A braking device according to claim 4, wherein said disc means comprises two discs which are spaced apart axially of the journal, said discs being mounted on roller bearings, and there being a spacer ring between the two discs to maintain their spacing.

6. A braking device according to claim 4, wherein said disc means is a single solid disc having radial wall surfaces which serve for attaching said brake drums, said second pair of drums and said pair of rims, one of said radial wall surfaces of the disc having a first circular shoulder which serves as a centering bearing for supporting the said second pair of drums which are fixed within the width of the shoulder by an annular plate bolted to the drums and to the disc, said annular plate having on its external radial face a second circular shoulder acting as a centering bearing for one of said brake drums.

7. A braking device according to claim 6, in which the other radial face of the disc has a third circular shoulder for seating the second brake drum, the latter being secured thereto by bolts.

* * * * *